Oct. 28, 1924.

L. C. BYCE

BROODER

Filed Aug. 5, 1922

1,513,154

L. C. Byce
INVENTOR

BY Victor J. Evans
ATTORNEY

WITNESS:

Patented Oct. 28, 1924.

1,513,154

UNITED STATES PATENT OFFICE.

LYMAN C. BYCE, OF PETALUMA, CALIFORNIA.

BROODER.

Application filed August 5, 1922. Serial No. 579,816.

*To all whom it may concern:*

Be it known that I, LYMAN C. BYCE, a citizen of the United States, residing at Petaluma, in the county of Sonoma and State of California, have invented new and useful Improvements in Brooders, of which the following is a specification.

This invention relates to brooders, and comprehends a construction designed to admit fresh air into the enclosure, the air being maintained at a proper temperature to eliminate all precipitation of moisture to the floor, which the chicks occupy.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1:
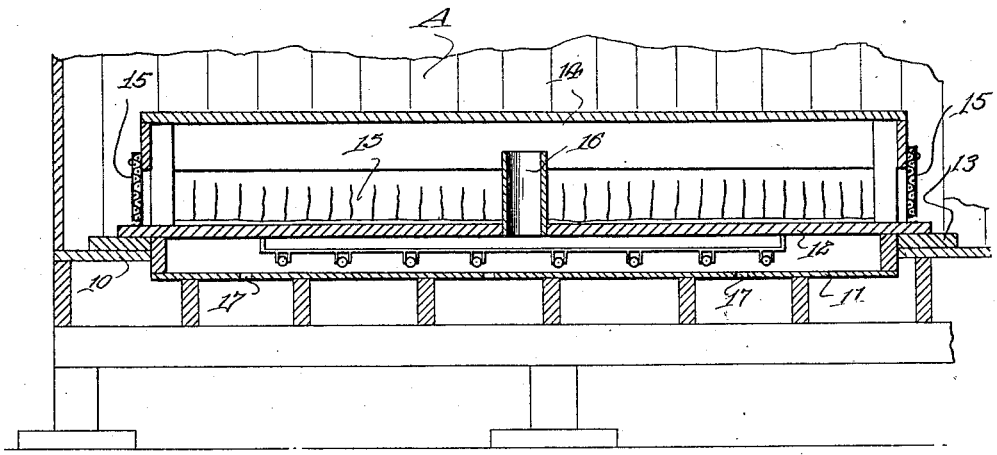
Figure 1 is a sectional view through the brooder constructed in accordance with one embodiment of the invention.
Figure 2:
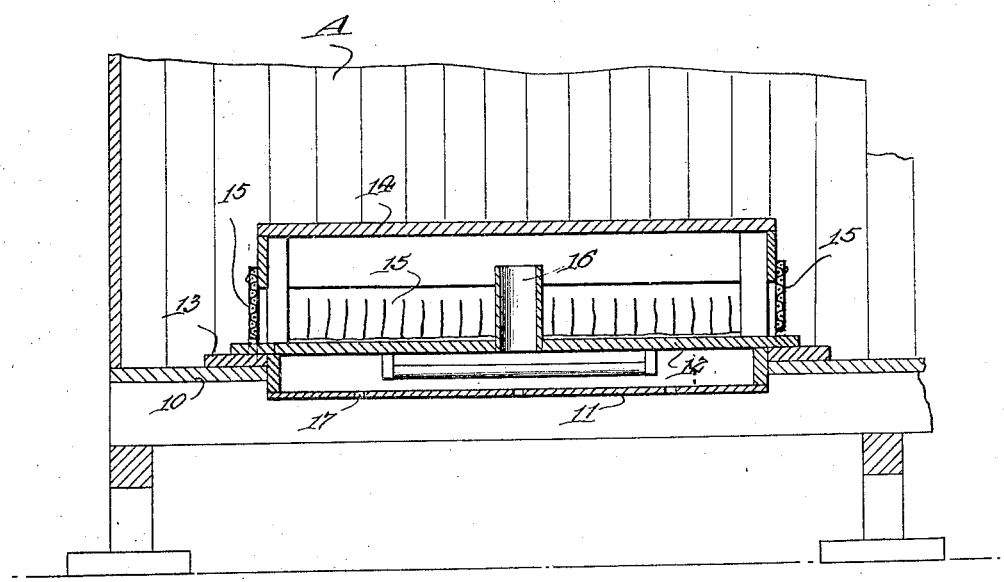
Figure 2 is a sectional view taken at a right angle to Figure 1.

Referring to the drawings in detail and particularly Figures 1 and 2, A indicates generally the brooder house, wherein the main floor is indicated at 10. This floor is provided with what I term a pit indicated at 11, and the side and end walls of this pit project a slight distance above the floor 10. Reposing upon the pit, and consequently spaced from the main floor 10 is an auxiliary floor 12. This auxiliary floor projects beyond the sides and ends of the pit 11, and the marginal edges of the auxiliary floor rest upon planks or the like 13, this construction providing a step for the chicks to enable them to reach the auxiliary floor. Supported by the auxiliary floor 12 is a hover or sheltering member 14 which is preferably constructed of non-flexible material, while depending from the lower edges of this member are curtains 15. Rising from the auxiliary floor 12 and positioned within the hover are one or more ventilating tubes 16 which convey fresh air from the pit 11 into the space above the auxiliary floor 12. It is of course understood that this air enters the pit 11 through a plurality of openings 17 provided in the bottom thereof. Arranged in the pit 11 are electrical heating elements, by means of which the air is heated to a proper temperature prior to its admittance into the ventilating tubes, thereby keeping the auxiliary floor 12 heated and preventing the possibility of any moisture collecting on this auxiliary floor, especially during cold or damp weather. I contemplate using a circuit breaker, although I have not shown the same, the circuit breaker of course being used to regulate the temperature of the air in the pit and hover 14.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

In a brooder, a housing, a pit arranged below the bottom of the housing, a horizontal beam supported on the bottom of the housing adjacent the ends of the pit, a hover, a bottom therefor resting on the beam, a curtain depending from the sides of the hover to the bottom thereof, means in the pit for heating air, and a conduit communicating with the pit and extending into the hover.

In testimony whereof I affix my signature.

LYMAN C. BYCE.